United States Patent [19]

Tidmarsh

[11] Patent Number: 4,549,842
[45] Date of Patent: Oct. 29, 1985

[54] CARGO CONTAINER LIFT DEVICE

[76] Inventor: David Tidmarsh, 3509 N. Hackett Ave., Milwaukee, Wis. 53217

[21] Appl. No.: 487,879

[22] Filed: Apr. 21, 1983

[51] Int. Cl.[4] .............................................. B65G 67/02
[52] U.S. Cl. ..................................... 414/391; 254/45; 254/89 H; 414/399
[58] Field of Search ....................... 414/391, 399, 498; 254/45, 89 H

[56] References Cited

U.S. PATENT DOCUMENTS

| | | | |
|---|---|---|---|
| 977,705 | 12/1910 | Bryan | 414/391 |
| 982,977 | 1/1911 | Morgan | 414/391 |
| 2,069,236 | 2/1937 | Fitch | 254/45 |
| 3,028,024 | 4/1962 | Black | 414/391 X |
| 3,083,847 | 4/1963 | Marini | 414/391 |
| 3,151,751 | 10/1964 | Marini | 414/572 |
| 3,208,608 | 9/1965 | Tantlinger et al. | 414/399 X |
| 3,275,298 | 9/1966 | Hand | 414/498 X |
| 3,289,868 | 12/1966 | Miller et al. | 254/45 |
| 3,360,141 | 12/1967 | Martin | 414/391 X |
| 3,421,646 | 1/1969 | Rouse et al. | 414/498 |
| 3,744,652 | 7/1973 | Rieschel | 254/89 H X |
| 3,764,028 | 10/1973 | Blackburn | 414/391 |
| 4,058,293 | 11/1977 | Kameda | 254/89 H |

FOREIGN PATENT DOCUMENTS

| | | | |
|---|---|---|---|
| 2741957 | 3/1978 | Fed. Rep. of Germany | 414/391 |
| 2903767 | 8/1980 | Fed. Rep. of Germany | 414/391 |
| 64374 | 6/1978 | Japan | 414/391 |
| 1527944 | 10/1978 | United Kingdom | 414/391 |
| 2084110 | 4/1982 | United Kingdom | 414/399 |
| 852746 | 8/1981 | U.S.S.R. | 414/399 |

*Primary Examiner*—Robert J. Spar
*Assistant Examiner*—Stuart J. Millman
*Attorney, Agent, or Firm*—Michael, Best & Friedrich

[57] ABSTRACT

A cargo container lift device comprised of a plurality of upright posts which define a bay into and out of which a transportation vehicle is driven. Vertical plates are slidably mounted on each of the posts and engage laterally extending supports which are movably connected to the cargo container. Hydraulic rams connecting the posts and plates permit the reciprocative movement of plates. Wheels mounted on the plates for common movement therewith counteracts the torque on the plates from the cargo container.

5 Claims, 5 Drawing Figures

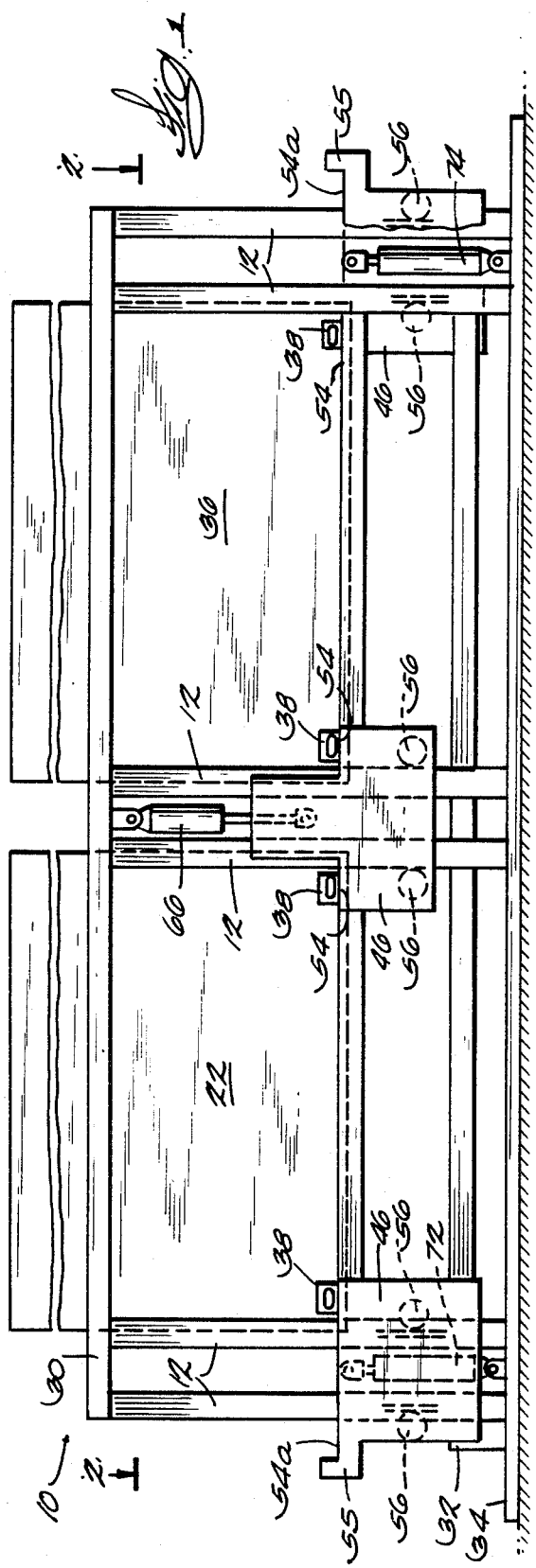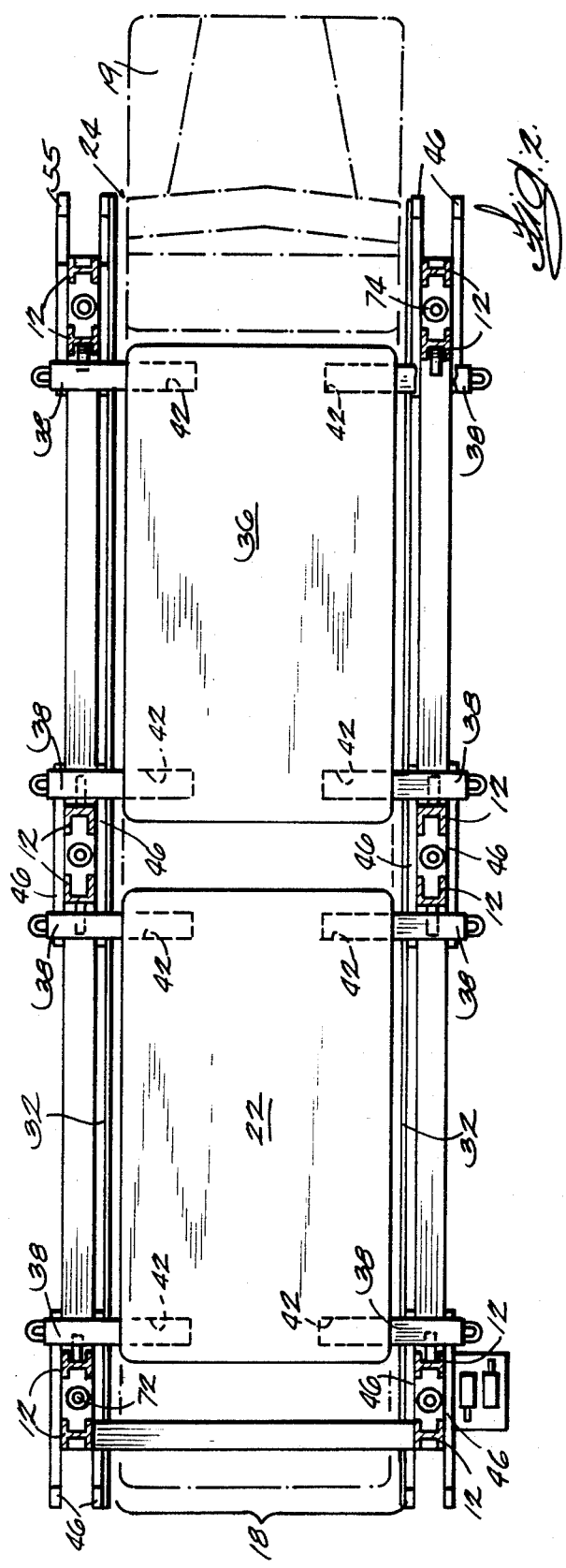

4,549,842

CARGO CONTAINER LIFT DEVICE

BACKGROUND OF THE INVENTION

This invention relates to devices used for the lifting and lowering of one or more demountable cargo containers from transportation vehicles.

Devices which lift and lower demountable cargo containers are useful because of their ability to permit the same cargo containers to be carried by different vehicles. The cargo containers can also be removed from a vehicle to have their contents either unloaded or loaded without having to have the vehicle waiting. Likewise, a container can be filled and ready to be placed on a vehicle when it arrives without the vehicle having to wait to have the cargo loaded on the vehicle.

A device of this type was described in Fitch U.S. Pat. No. 2,069,236. This device utilized a vertical hydraulic cylinder connected to a horizontal plate to engage the underside of a cargo container for lifting and lowering the container. Marini U.S. Pat. Nos. 3,083,847 and 3,151,751 illustrate another device of this type utilizing a hydraulic cylinder connected to a sliding arm which engages the underside of a cargo container. Blackburn U.S. Pat. No. 3,764,028 illustrates another device of this type using mechanical linkage to turn a jackscrew to cause a horizontal plate to engage the underside of a cargo container. Miller U.S. Pat. No. 3,289,868 is another device of this type which uses a hydraulic cylinder with an attached horizontal plate to fit into a socket in the side of the cargo container to lift the container.

SUMMARY OF THE INVENTION

A principal object of this invention is to provide a simple to operate economical device for lifting and lowering demountable cargo containers from a transportation vehicle.

Another object of this invention is to provide such a device which is capable of operating without fouling under adverse weather conditions, such as ice or snow.

Another object of this invention is to provide such a device which requires only a reasonably flat surface on which to operate and no special foundation.

Another object of this invention is to provide such a device which can operate on single phase power.

For the achievement of the above and other objectives, this invention provides a device for lifting and lowering at least one demountable cargo container from and onto a transportation vehicle. The device includes means defining a bay into and out of which the transportation vehicle can be driven, means for engaging the container including vertical plates mounted on the bay defining means, and means for causing reciprocative movement of the engaging means.

In one embodiment, the invention provides a device comprising a plurality of upright posts which define a bay into and out of which the transportation vehicle is driven. Vertical plates slidably mounted on each of the posts engages laterally extending support means which are movably connected to the cargo container. Hydraulic rams connecting the posts and plates permit the plates to be moved up or down. Means for counteracting the torque loads on the plates is mounted on or attached to the plates for common movement therewith.

DESCRIPTION OF THE DRAWINGS

FIG. 1 is a side elevation view of a cargo container lift device used for lifting or lowering two cargo containers from a transportation vehicle.

FIG. 2 is a cross-sectional view of the lift device taken along line 2—2 in FIG. 1, with hydraulic controls added to the device and a transportation vehicle in the bay.

DESCRIPTION OF THE PREFERRED EMBODIMENT

Figure 3:
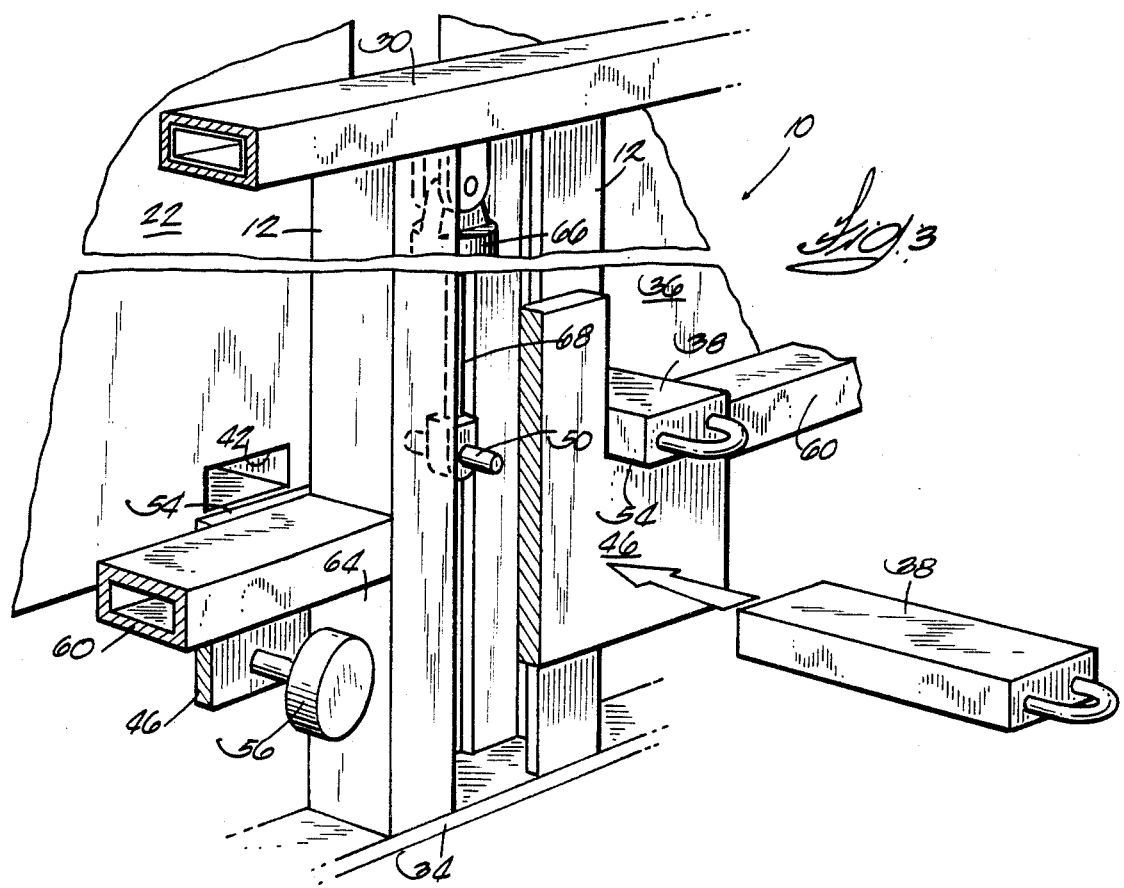
FIG. 3 is a fragmentary, perspective view, partially in section and partially exploded, of the center posts and elements shown in FIG. 1.

As illustrated in FIGS. 1 and 2, a cargo container lift device 10 embodying the invention includes means defining a bay 18 into and out of which a transportation vehicle 19 can be driven. As shown in FIG. 2, the bay 18 is defined by six pairs of upright posts 12. The posts at the bay entrance 24 and at the rear of the bay 18 are I-beams while the center posts are U-shaped channels.

The posts 12 are held in an upright position by upper struts 30 which connect the tops of adjacent posts 12 along the sides of the bay 18. As illustrated in FIG. 1, the posts 12 are also held in place by lower struts 34 which connect the bottoms of the posts 12 on each side of the bay 18 and transverse struts (not shown) which connect the lower ends of opposed posts. The struts insure that the posts 12 will be held in an upright position no matter what type of foundation is used with the device 10.

Bumper rails 32 are attached to the inside of the longitudinal sides of the bay 18 for assisting the operator in guiding the transportation vehicle 19 into the bay 18 as illustrated in FIG. 2.

The device 10 is used to lift or lower cargo containers 22 and 36 from or onto a transportation vehicle 19. As illustrated in FIG. 3, the cargo containers 22 and 36 are supported on the device 10, as explained in more detail below, by longitudinally spaced, laterally outwardly extending support means or bars 38. While a larger number can be used, at least one pair of bars 38 is located on each side of each cargo container near the lower front and rear corners. The bars 38 are movably mounted on the containers so they can be retracted toward or completely removed from the containers to permit free movement of the transportation vehicle 19 into and out of the bay 18. In the specific construction illustrated in FIG. 3, the bars 38 slide into pockets 42 provided in the sides of the containers and can be inserted into and removed from the pocket 42 as needed.

The device 10 further includes means for engaging and lifting containers via the bars 38. In the construction illustrated in FIG. 3, such means includes a pair or set of vertical plates 46 disposed on the opposite sides of the posts 12 and connected together by a bolt 50. Reciprocative vertical movement of the posts 12 is guided by the plates 46. Each plate 46 has a longitudinally extending edge 54 which engages a bar 38 extending from a cargo container. The engaging edges 54 for one side of a container are at the same level, so that the side of a cargo container remains substantially horizontal as it is lifted and lowered.

In the specific construction illustrated in FIG. 1, the plates 46 at the entrance and rear ends of the bay 18 are arranged to accept cargo containers by different lengths. Each of these sets of plates 46 has an extension 55 projecting longitudinally beyond the respective posts 12 and having an edge 54a for engaging a bar 38. Thus, when cargo containers longer than those illustrated in FIG. 1 are used, the bars 38 for the forward end of the container 22 rest on the edges 54a of the front set of plates 46 and the bars 38 for the rear end of the container 36 rest on the extension 54a of the rear set of plates 46.

The vertical plates 46 on the device 10 can have different shapes and sizes, as do, for example, the end and center plates shown in FIG. 1 so long as they have sufficient structural integrity to support the maximum anticipated weight of the cargo containers.

Means are provided for counteracting torque exerted on the vertical plates 46 by the cargo container. In the construction illustrated in FIG. 3, such means includes a wheel 56 rotatably mounted on and between each pair of plates 46 at a location below the engaging edges 54. The wheel 56 rides against the connecting rib 64 of the I-beam post 12. The turning moment imposed on the plates 46 by a cargo container via the bar 38 is resisted by the wheel 56 bearing against the post rib 64.

The turning moment imposed on the plates 46 by a cargo container is further counteracted by a longitudinal rail 60 extending between and affixed on the pair of plates 46 for each side of a cargo container. The rails 60 also serve to maintain the plates 46 in proper alignment with respect to the corresponding posts.

Means are provided for effecting reciprocative vertical movement of the plates 46 relative to the posts 12. In the specific construction illustrated, such means includes a hydraulic ram 66 connected to each set of plates 46. Referring to the center posts 12 shown in FIG. 3, the cylinder end of a hydraulic ram 66 is pivotally connected to the upper strut 30. The hydraulic ram 66 includes a piston rod 68 which is pivotally connected to the vertical plates 46 via the connecting bolt 50. Extension and retraction of the hydraulic piston rod 68 respectively moves the plates 46 down and up relative to the posts 12. The rail 60 extending between the vertical plates 46 on each side of the bay 18 limits any significant sideways movement of the plates 46.

The alternate hydraulic rams on each side of the bay 18 are connected to the plates 46 in reverse relationship so they can be connected together in series hydraulically. That is, referring to FIG. 1, the cylinder end of the hydraulic rams 72 and 74 for the posts 12 at the entrance and rear ends of the bay 18, respectively, is pivotally connected to the lower strut 34 and the piston or rod end is pivotally connected to the corresponding set of plates 46. The cylinder end of the hydraulic ram 66 for the center posts is pivotally connected to the upper strut 30 and the piston or rod end is pivotally connected to the corresponding set of plates 46. Thus, to raise the plates 46 on one side of the bay 18, the piston rods of the end hydraulic rams 72 and 74 are extended and the piston rod of the center hydraulic ram 66 is retracted. With this arrangement, one source of hydraulic fluid and one control valve can be used to simultaneously apply a balanced pressure on all hydraulic rams.

As best shown in FIG. 3, the hydraulic rams 66, 72 and 74 are disposed between the opposed flanges of the posts 12 and, thus, are protected against being bumped by the transportation vehicle 19 as it is being backed into and driven from the bay 18.

The hydraulic rams are connected to a source of hydraulic fluid through a control system which is capable of selectively operating the vertical plates 46 on both sides of the bay in unison and also operating the vertical plates 46 on one side of the bay 18 independently of those on the other side.

Figure 5:
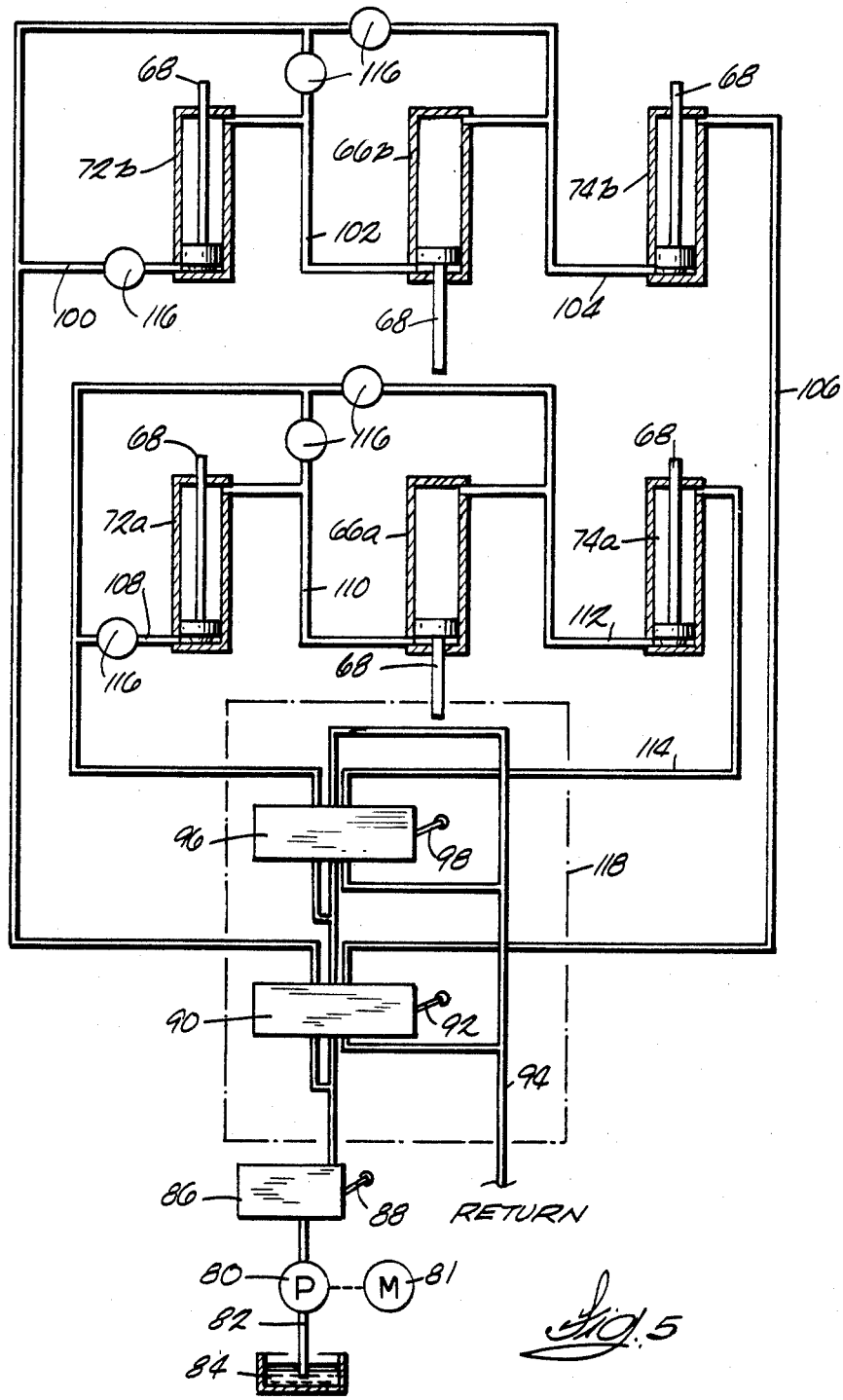
FIG. 5 is a schematic drawing of the hydraulic control means and other hydraulic components.

Such a control system is schematically illustrated in FIG. 5 wherein the hydraulic rams one side of the bay 18 are designated by reference numerals 66a, 72a and 74a and those on the other side are represented by reference numerals 66b, 72b and 74b. The control system includes pump 80 having an inlet 82 connected in fluid communication with a reservoir 84 and driven by an electric motor 81 capable of operating with single-phase power. Flow of pressurized hydraulic fluid from the pump 80 for actuation of the hydraulic rams is controlled by a selector valve 86 operated by a pivotal handle 88.

Flow of hydraulic fluid to and from the hydraulic rams 72b, 66b, and 74b is controlled by a 4-way control valve 90 which is operated by a pivotal handle 92 and is connected in fluid communication with the selector valve 86 and with a return 94 to the reservoir 84. Flow of hydraulic fluid to and from the hydraulic rams 72a, 66a, and 74a is controlled by a 4-way control valve 96 which is operated by a pivotal handle 98 and is connected in fluid communication with the selector 86 and with the return 94.

When the operating handle 92 on the control valve 90 is moved to the "lift" or "raise" position (with the handle 88 on the selector valve 86 in the "operate" position), pressurized hydraulic fluid is supplied via a conduit or hose 100 to the hydraulic ram 72b to extend its piston rod 68. Hydraulic fluid expelled from the hydraulic ram 72b flows via a conduit or hose 102 to the hydraulic ram 66b to retract its piston rod 68 and hydraulic fluid expelled from the hydraulic ram 66b flows via a conduit or hose 104 to the hydraulic ram 74b to extend its piston rod 68. Hydraulic fluid expelled from the hydraulic ram 74b returns to the reservoir 84 via a conduit or hose 106, the control valve 90, and the return 94.

When the operating handle 92 of the control valve 90 is moved to the "lower" position, hydraulic fluid is supplied to the hydraulic rams 74b, 66b, and 72b in the reverse direction through the hoses 106, 104 and 102 and hydraulic fluid expelled from the hydraulic ram 72b is returned to the reservoir 84 via hose 100, the control valve 90 and the return 94. The piston rods 68 on the hydraulic rams 74b and 72b retract and the piston rod 68 on the hydraulic ram 66b extends.

The hydraulic rams 72a, 66a are actuated by a similar operation of the handle 98 on the control valve 96. For instance, when the operating handle 98 is moved to the "lift" or "raise" position, pressurized hydraulic fluid is supplied via a conduit or hose 108, hydraulic fluid expelled from the hydraulic ram 72a flows via a conduit or hose 110 to the hydraulic ram 66a, hydraulic fluid expelled from the hydraulic ram 66a flows via a conduit or hose 112 to the hydraulic ram 74a, returns to the reservoir via a conduit or hose 114, the control valve 96 and the return 94. By-pass lines and shut off valves 116 can be provided as illustrated so that individual hydraulic rams can be isolated for maintenance and/or operated separately.

The control valves 90 and 96 preferably are housed in a dual control unit 118 with the operating handles 92 and 98 close to each other. This permits an operator to conveniently operate both handles simultaneously with one hand and also operate only one when it is desired to raise or lower the plates 46 on one side of the bay 18 independently of those on the other side. This capability facilitates maneuvering the cargo containers back into place on the chassis of the transportation vehicle 19.

In operation, an operator backs a transportation vehicle hauling two cargo containers into the bay 18. He then slides a bar 38 into each pocket 42 on both sides of the cargo containers and releases the mechanism removably fastening the cargo containers to the chassis of the transportation vehicle. The handle 88 on the selector valve 86 is then moved to the "operate" position, after the pump 80 has been started, and both the control handles 92 an 98 are moved to the "raise" position. As the plates 46 on both sides of the bay move upwardly in unison, the edges 54 engages the bars 38 and both cargo containers are lifted off the chassis of the transportation vehicle 19. The transportation vehicle 19 can then be driven out of the bay 18.

The cargo containers 22 and 36 are held in an elevated position until another transportation vehicle 19 is backed into the bay 18. This vehicle may have a chassis arranged to accept two cargo containers or only one cargo container. In either case, the vehicle is moved into place with the chassis situated beneath one or both the cargo containers. Both control handles 92 and 98 are moved to the "lower" position to lower the cargo container(s) onto the vehicle chassis. One of the control valve handles can be operated separately when necessary to guide the fastening mechanism on a cargo container into place with its complementay part on the vehicle chassis. The bars 38 are removed from the pockets 38 as shown in FIG. 3 and the vehicle can be driven from the bay 18 after the cargo container(s) are fastened to the chassis. If only the front cargo container is removed, the device can be raised to permit another vehicle to be backed into the bay 18 for removal of the rear cargo container.

Figure 4:
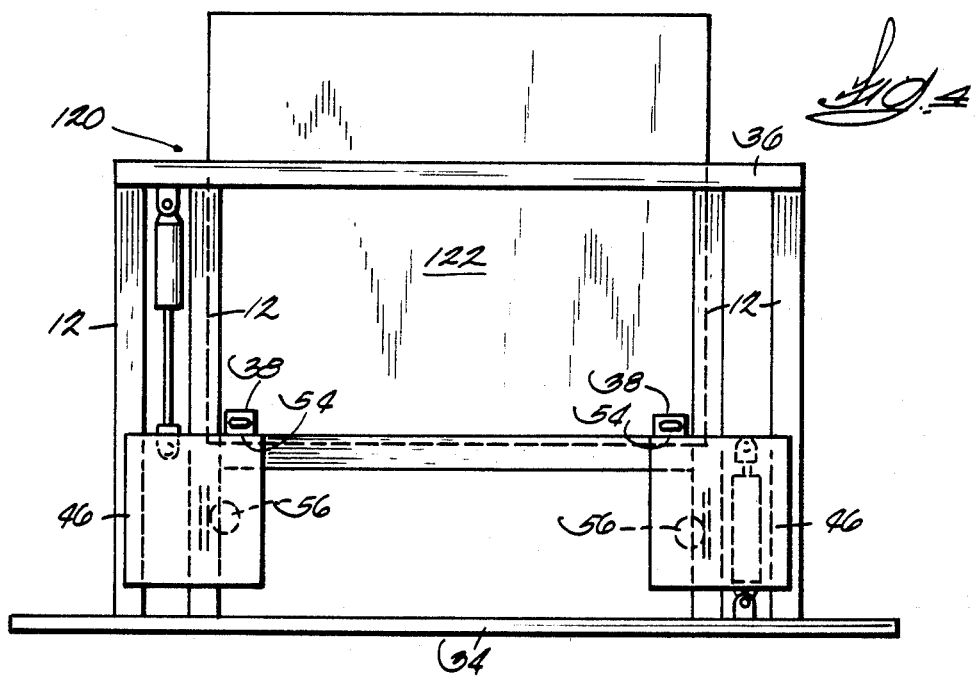
FIG. 4 is a side view of a lift device for lifting or lowering a single cargo container from a transportation vehicle.

The device 10 shown in FIG. 1 can lift and lower two cargo containers 22 and 36 at one time. FIG. 4 shows a lift device 120 for lifting or lowering a single cargo container 122. The device 120 is arranged and operates in the same manner as the device 10 shown in FIGS. 1-5, except that only two posts 12, two sets of plates 46 and two hydraulic rams 66 are used on each side of the bay. Accordingly, common components are designated by the same reference numerals.

It is to be understood that the invention is not confined to the particular construction and arrangement of parts as herein illustrated and described, but embraces all such modified forms thereof as come within the scope of the following claims.

I claim:

1. A device for lifting and lowering a demountable cargo container from and onto a transportation vehicle with a plurality of movable support means connected to and extending laterally outward from opposite sides of said cargo container, said device comprising at least two pair of opposed, transversely spaced, upright posts defining an elongate bay having a longitudinal axis and into and out of which the transportation vehicle can be driven, each of said posts including upper and lower ends, strut means interconnecting said posts and including lower strut means interconnecting said lower ends of said posts and adapted to rest on a substantially flat surface, a pair of vertical plates extending generally parallel to the longitudinal axis of the bay and slidably mounted on each of said posts and guided thereby for reciprocative vertical movement relative to the respective post, at least one of said plates in each pair including an edge portion which engages one of the corresponding laterally extending support means for lifting and lowering the cargo container in response to movement of said plates, a hydraulic ram connected between each of said posts and each of said pairs of plates for effecting vertical reciprocative movement of said plates, each of said hydraulic rams including an extendable and retractable piston rod with said hydraulic rams on each side of the bay being connected to said posts and said plates so that said piston rod of one of said hydraulic rams extends and said piston rod of the adjacent one of said hydraulic rams retracts to raise the respective plates and said piston rods move in the reverse direction to lower the respective plates, means for counteracting a turning moment exerted on said plates by the cargo container through the support means, said counteracting means comprising a wheel rotatably mounted on each of said plates adjacent to said posts and positioned so as to bear against said posts and counteract the turning moment exerted on said plate by the cargo container through the support means, and hydraulic control means for selectively moving said piston rods on both sides of the bay in unison throughout the travel of said piston rods and for selectively operating said piston rods on either side of said bay independently of piston rods on the other side of the bay at any point in the travel of said piston rods.

2. A device according to claim 1 wherein each of said posts comprises a pair of longitudinally-spaced members and a said hydraulic ram is positioned between each pair of said members.

3. A device according to claim 1 comprising a first set of said posts defining a first bay and a second set of said posts longitudinally spaced from said first set defining a second bay which together with the first bay is long enough to receive a transportation vehicle carrying two cargo containers, whereby said device can lift and lower both of the cargo containers simultaneously.

4. A device according to claim 1 wherein said means for counteracting the turning moment exerted on said plate means further comprises a rail attached to and extending between adjacent plates on both sides of the bay.

5. A device according to claim 1 which further includes a bumper rail on each longitudinal side of the bay for assisting in guiding the transportation vehicle into the bay.

* * * * *